(12) United States Patent
Carozza

(10) Patent No.: US 8,312,106 B2
(45) Date of Patent: Nov. 13, 2012

(54) OPTIMIZING THE EFFICIENCY OF AN IMAGE RETRIEVAL SYSTEM

(75) Inventor: Nicholas Carozza, El Sobrante, CA (US)

(73) Assignee: Bank of America Corporation, Charlotte, NC (US)

( * ) Notice: Subject to any disclaimer, the term of this patent is extended or adjusted under 35 U.S.C. 154(b) by 374 days.

(21) Appl. No.: 12/623,503

(22) Filed: Nov. 23, 2009

(65) Prior Publication Data

US 2011/0125766 A1   May 26, 2011

(51) Int. Cl.
G06F 15/16   (2006.01)
(52) U.S. Cl. .................................................. 709/217
(58) Field of Classification Search .................. 709/201, 709/217, 226
See application file for complete search history.

(56) References Cited

U.S. PATENT DOCUMENTS

| | | | |
|---|---|---|---|
| 2005/0102255 A1* | 5/2005 | Bultman | 707/1 |
| 2006/0118613 A1* | 6/2006 | McMann et al. | 235/379 |
| 2006/0280354 A1* | 12/2006 | Murray | 382/137 |
| 2008/0189126 A1* | 8/2008 | Abernethy et al. | 705/1 |
| 2009/0307690 A1* | 12/2009 | Logan et al. | 718/1 |

* cited by examiner

Primary Examiner — Jason Recek
(74) Attorney, Agent, or Firm — Banner & Witcoff, Ltd.; Michael A. Springs

(57) ABSTRACT

Aspects of this disclosure relate a system for retrieving images that may include one or more mainframe computer sites or Logical Partitions (LPARS) one or more servers operatively connected to the LPARS, and one or more databases operatively connected one or more of the LPARS. The system may also include a processor that may be configured to perform a method for generating electronic cash letters. The method for generating electronic cash letters may include reading a primary input key file assigned to the cash letter job, wherein the primary input key file includes a set of keys and each key corresponds to an image stored in one of the databases. The method may further include splitting the keys in the primary input key file into individual key files. The method may further include attaching a key processor subtask to each of the individual key files and running the key processor subtasks concurrently and independently of one another, wherein each of the key processor subtasks connects to one of the servers via TCP/IP protocol and retrieves the images from the particular database to which the keys in individual key files correspond.

20 Claims, 10 Drawing Sheets

OPTIMIZING THE EFFICIENCY OF AN IMAGE RETRIEVAL SYSTEM

BACKGROUND

Checks are a form of payment wherein a drawer (i.e., the person who writes the check), instructs a financial institution (e.g., a bank or credit union) to pay the payee (i.e., the person to whom the check is written) a particular amount of funds from a financial account that the drawer has with the financial institution. Often the payee deposits the check in a financial account with the payee's own financial institution and the payee's financial institution will process the check. However, conventional methods for processing a check can be inefficient and time consuming. It would be advantageous to have a system that reduces or eliminates at least some of the inefficiencies of conventional methods for processing a check.

SUMMARY

It would be beneficial to provide a system and a method that reduce or eliminate at least some of the inefficiencies of conventional methods for processing a check.

Aspects of this disclosure relate to a system for retrieving images that may include one or more mainframe computer sites or Logical Partitions (LPARS), one or more servers operatively connected to the LPARS, and one or more databases operatively connected to one or more of the LPARS. The system may also include a processor that may be configured to perform a method for generating electronic cash letters. The method for generating electronic cash letters may include reading a primary input key file assigned to a cash letter job, wherein the primary input key file includes a set of keys and each key corresponds to an image stored in one of the databases. The method may further include splitting the keys in the primary input key file into individual key files. The method may further include attaching a key processor subtask to each of the individual key files and running the key processor subtasks concurrently and independently of one another, wherein each of the key processor subtasks connects to one of the servers via TCP/IP protocol and retrieves the images from the particular database to which the keys in the individual key files correspond.

Further aspects are related to a computer assisted method for generating electronic cash letters which may include using a computer to electronically retrieve electronic check images from one or more databases that are operatively connected to one or more LPARs which are operatively connected to one or more servers. The method may further include using the computer to read a primary input key file, wherein the primary input key file includes a set of keys and each key corresponds to an image stored in one of the databases and splitting the keys in the primary input key file into individual key files, wherein the keys in individual key files correspond to electronic check images stored in a single database. The method may further include using the computer to attach a key processor subtask to each of the individual key files and running the key processor subtasks concurrently and independently of one another, wherein each of the key processor subtasks connects to one of the servers via TCP/IP protocol and retrieves the electronic check images from the particular database to which the keys in the individual key files correspond.

Additional aspects relate to a computer which includes a processor and a memory storing computer executable instructions that, when executed by the processor, configure the computer to perform a method of retrieving electronic check images from a plurality of databases. The method may include reading a primary input key file, wherein the primary input key file includes a set of keys and each key corresponds to an electronic check image stored in one of the databases. The method may further include splitting the keys in the primary input key file into individual key files, wherein the keys in individual key files correspond to electronic check images stored in a single database, wherein splitting the keys in the primary input key file into individual key files includes sorting all the keys in the primary input key file into a group of keys for each particular database of the plurality.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

Figure 1:
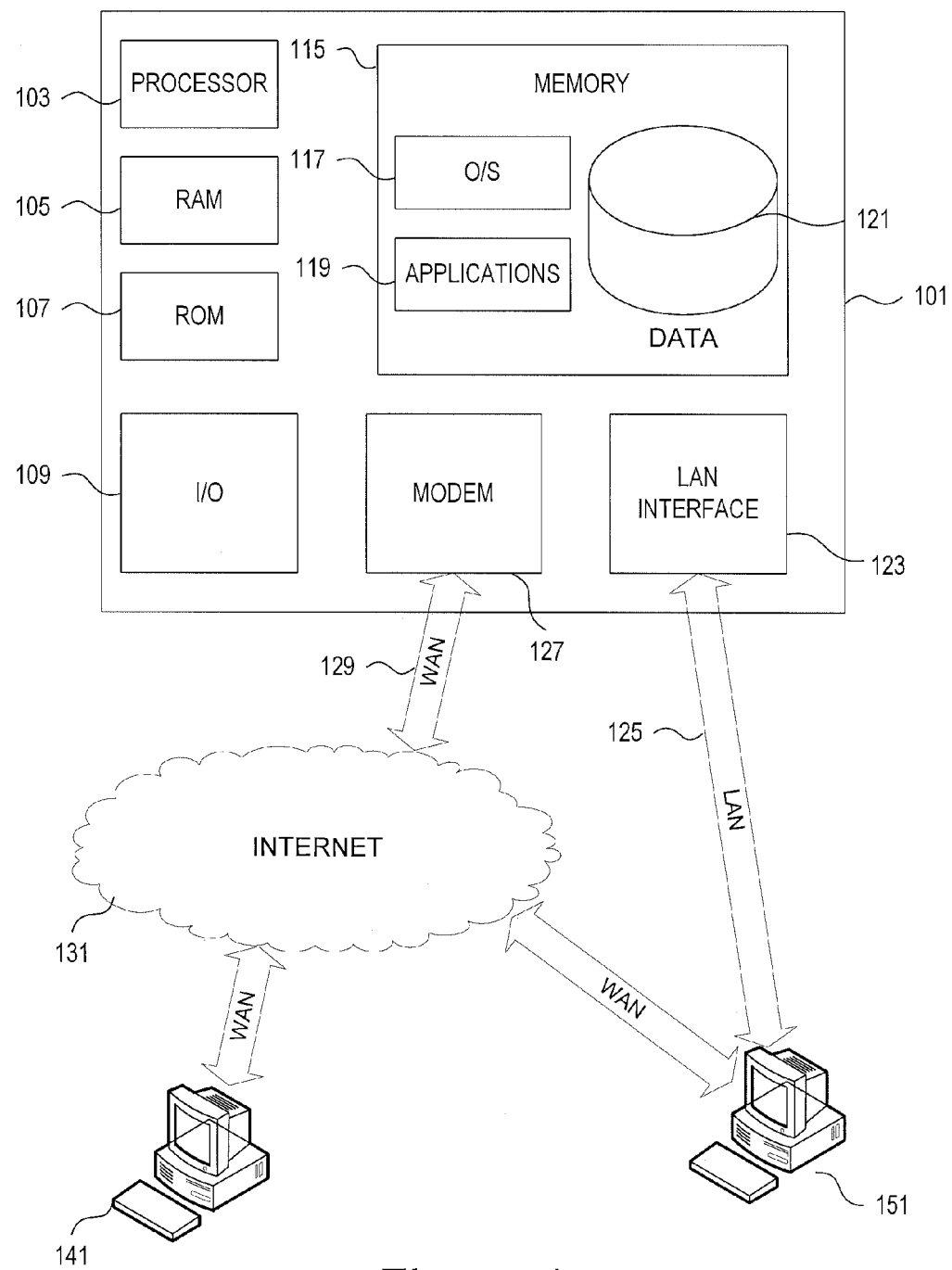
FIG. 1 illustrates a diagram of a general-purpose digital computing environment in which certain aspects of the present disclosure may be implemented.

FIG. 1 illustrates an example of a suitable computing system environment 100 that may be used according to one or more illustrative embodiments of the disclosure. The computing system environment 100 is only one example of a suitable computing environment and is not intended to suggest any limitation as to the scope of use or functionality of the disclosure. Neither should the computing system environment 100 be interpreted as having any dependency nor requirement relating to any one or combination of components illustrated in the exemplary computing system environment 100.

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and the like. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computer 101 having a processor 103 for controlling overall operation of the computer 101 and its associated components, including RAM 105, ROM 107, input/output module 109, and memory 115. Computer 101 typically includes a variety of computer readable media. Computer readable media may be any available media that may be accessed by computer 101 and include both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 101. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Although not shown, RAM 105 may include one or more are applications representing the application data stored in RAM memory 105 while the computer is on and corresponding software applications (e.g., software tasks), are running on the computer 101.

Input/output module 109 may include a microphone, keypad, touch screen, and/or stylus through which a user of computer 101 may provide input, and may also include one or more of a speaker for providing audio output and a video display device for providing textual, audiovisual and/or graphical output. Software may be stored within memory 115 and/or storage to provide instructions to processor 103 for enabling computer 101 to perform various functions. For example, memory 115 may store software used by the computer 101, such as an operating system 117, application programs 119, and an associated database 121. Alternatively, some or all of computer 101's computer executable instructions may be embodied in hardware or firmware (not shown). As described in detail below, the database 121 may provide centralized storage of account information and account holder information for the entire business, allowing interoperability between different elements of the business residing at different physical locations.

Computer 101 may operate in a networked environment supporting connections to one or more remote computers, such as branch terminals 141 and 151. The branch computers 141 and 151 may be personal computers or servers that include many or all of the elements described above relative to the computer 101. The network connections depicted in FIG. 1 include a local area network (LAN) 125 and a wide area network (WAN) 129, but may also include other networks. When used in a LAN networking environment, computer 101 is connected to the LAN 125 through a network interface or adapter 123. When used in a WAN networking environment, the server 101 may include a modem 127 or router or other means for establishing communications over the WAN 129, such as the Internet 131. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the disclosure may include computer executable instructions for invoking user functionality related to communication, such as email, short message service (SMS), and voice input and speech recognition applications.

Terminals 141 or 151 may also be mobile terminals including various other components, such as a battery, speaker, and antennas (not shown). Input/output module 109 may include a user interface including such physical components as a voice interface, one or more arrow keys, joystick, data glove, mouse, roller ball, touch screen, or the like.

Typically when a check is written to a payee, the payee endorses a check and deposits the check with their financial institution (hereinafter "bank"). Prior to paying the payee the requested funds, the payee's bank usually puts a hold on the check while it was being processed during which time the funds are not available to the payee. Traditionally, processing a check involved the payee's bank sending the check back to the drawer's bank and the drawer's bank transferring the requested funds to the payee's bank. Once the requested funds were received by the payee's bank, the check was considered to have "cleared" and the payee's bank would deposit the requested funds in the payee's financial account or otherwise make the funds available to the payee. It would be beneficial for both the payee and the payee's bank if the amount of time required to process the check could be minimized so both the payee and the payee's bank could receive the funds more quickly.

Adoption of available technologies has allowed the method of processing a check to become more efficient. For example, paper checks may now be electronically scanned to produce electronic check images. Therefore, instead of the actual paper checks being transferred between banks, the check images may be electronically transmitted. Further, banks can generate electronic cash letters. An electronic cash letter is a letter from a first bank to a second bank asking for an amount of funds that the second bank owes the first bank based on one or more of the second bank's checks that have been presented to the first bank by payees. The electronic cash letter may include images of the second bank's checks that have been presented to the first bank and, also, the total amount of funds the second bank owes the first bank based on the checks. Once the second bank receives the electronic cash letter, the second bank can transmit the requested funds to the first bank. Upon receipt of the requested funds, the first bank can allow the checks to clear. The above described features of electronic check images and electronic cash letters decrease the amount of time it takes for a check to be processed. However, conventional methods for processing a check can still be optimized.

For example, as described above, in an electronic cash letter, a first bank may include all the available electronic check images from a second bank. However, a single bank may receive millions of checks each day. Further, the electronic check images may be created (e.g., scanned in) at different bank locations throughout the country. Therefore, retrieving all the electronic check images related to a specific electronic cash letter in order to incorporate them into the electronic cash letter can be challenging. A bank may have a computer system for processing the checks and generating the electronic cash letters. The general framework of such a computer system will be described below.

The bank's system may include a plurality of separate mainframe computer sites, or Logical Partitions (LPARS). An LPAR may be a subset of a computer's hardware resources that represent one computer with its own Operating System. Further, an LPAR may be a subset of computer hardware and system software visualized as a separate computer. For example, a physical machine may be partitioned into multiple LPARS, each housing a separate Operating System.

The LPARS may be located throughout the bank (e.g., the LPARs may be in different locations throughout the country). The particular system described in this disclosure may include eight LPARs (however, the number of LPARs in the system could vary as desired). For reference, the eight LPARs in this particular system will be referred to as: 1M LPAR, 1T LPAR, 2F LPAR, 2Q LPAR, 2R LPAR, 5F LPAR, 7L LPAR, 1G LPAR. Each of the eight LPARs may have one or more databases for storing electronic check images. For example, there may be 23 databases spread out among the eight LPARs (however, the number of databases in the system could vary as desired). For example, there may be one database at the 1M LPAR, three databases at the 1T LPAR, two databases at the 2F LPAR, and the like (of course other combinations of databases and LPARs could be implemented). When paper checks are presented to the bank by the payee, the paper checks may be scanned into the computer system to create an electronic check image and the electronic check image may be stored in one of the databases of a local LPAR. It is noted that the software used for scanning the checks, creating the electronic check images and operating the databases that store the electronic check images are commercially available.

The electronic check images may be uploaded to the databases on a minute by minute basis. Therefore, each day there may be millions of electronic check images uploaded to these databases. The electronic check images need to be retrieved from the databases and incorporated into electronic cash letters in order for the bank to process the checks and receive the funds from the second bank.

Figure 2A:
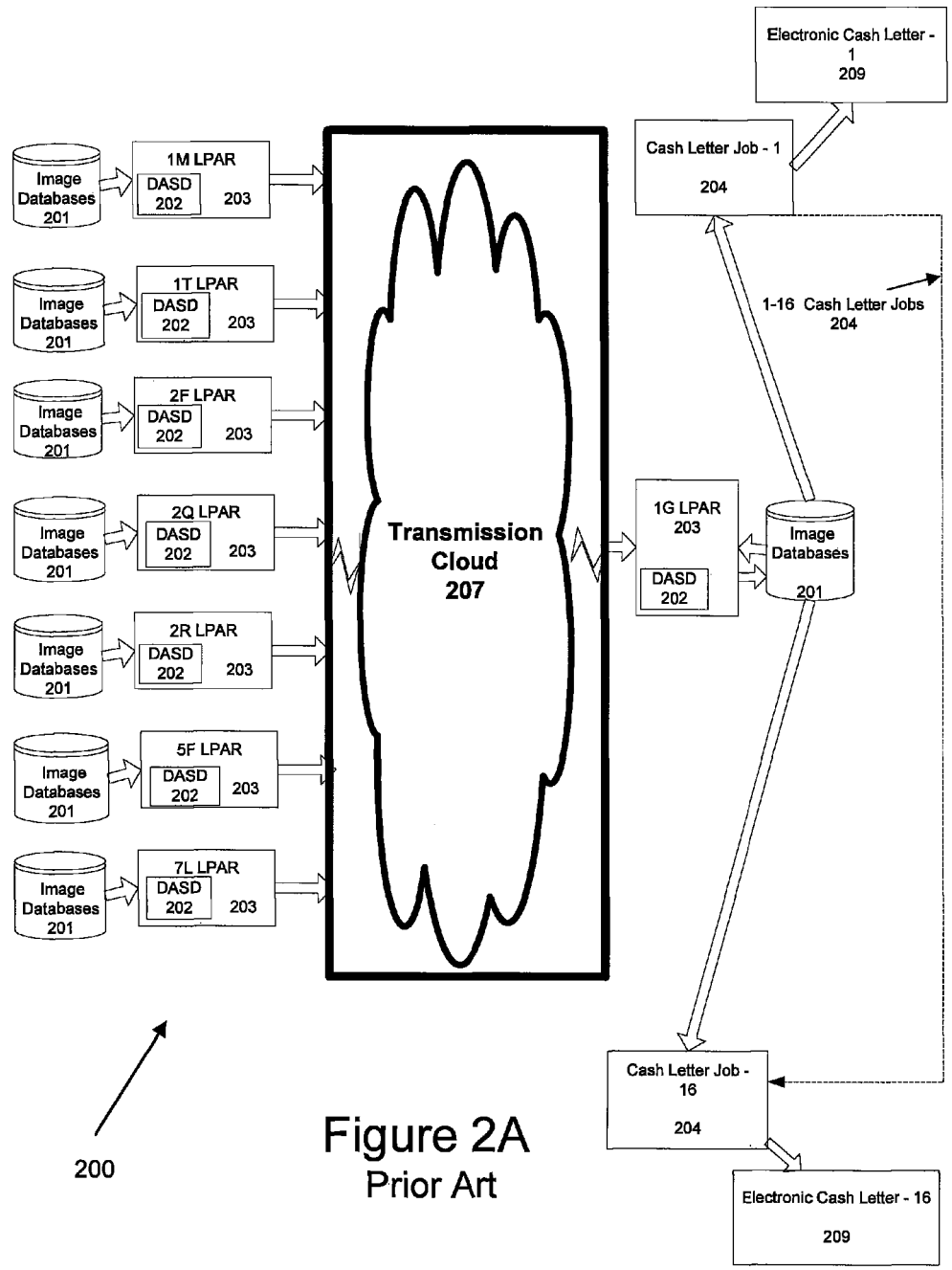
FIG. 2A illustrates a diagram which demonstrates a conventional system for generating electronic cash letters.
Figure 2B:
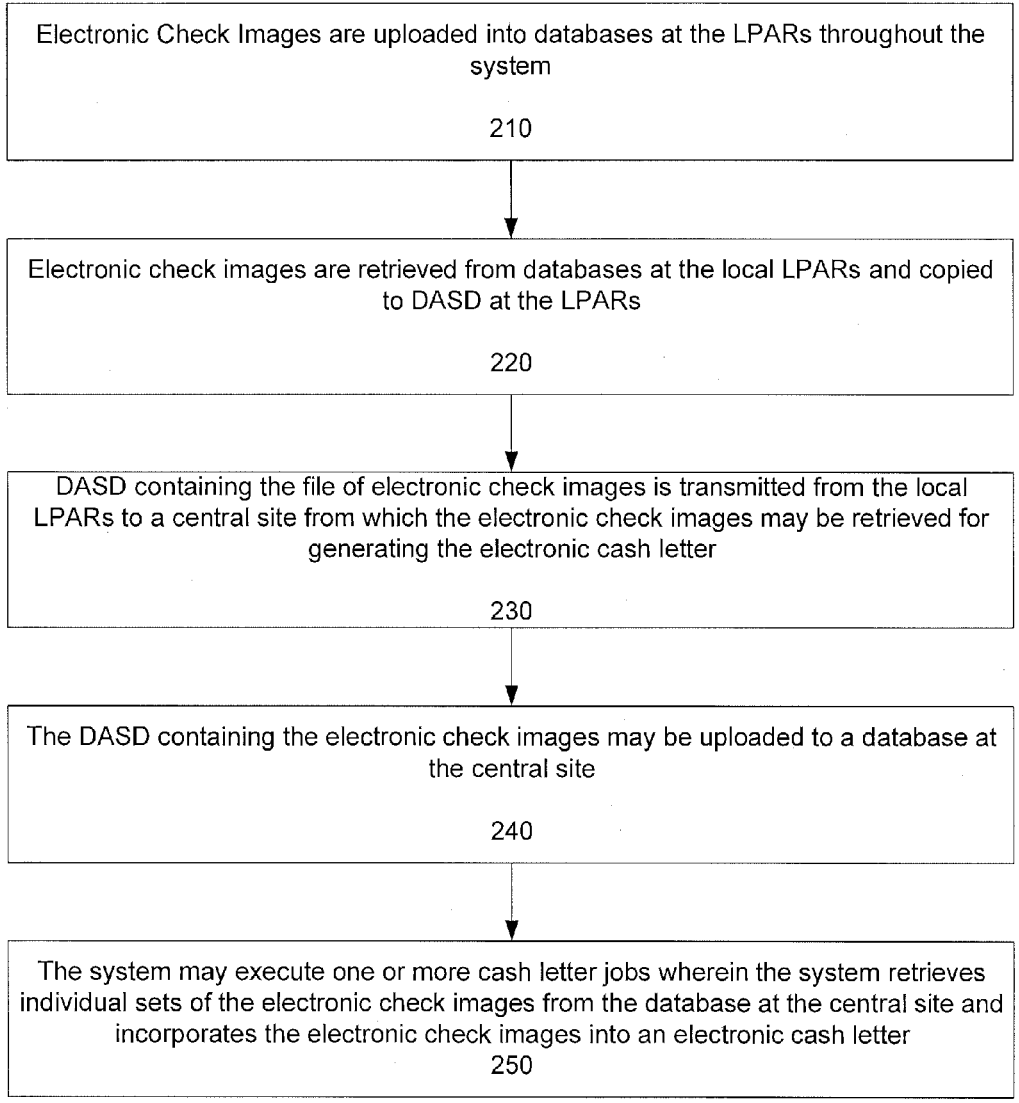
FIG. 2B illustrates a flow chart for a conventional method for generating electronic cash letters.

FIG. 2A illustrates a diagram which demonstrates a conventional system for generating electronic cash letters. FIG. 2B illustrates a flowchart which demonstrates a conventional method for generating electronic cash letters. As seen in FIG. 2A, the conventional system 200 includes at least some of the general framework of the computer system discussed above. For example, the conventional system includes the databases 201 and the eight LPARs 203. As seen in FIG. 2B, in step 210, new sets of electronic check images are uploaded into the databases 201 at the LPARs 203 throughout the system 200. In step 220, the electronic check images are retrieved from databases 201 at the local LPARs 203 and copied to a file (e.g., a DISK dataset or Direct Access Storage Device, DASD 202 may be used) at that LPAR 203. In step 230, the DASD 202 containing the file of electronic check images is transmitted from the local LPARs 203 to a central site such as a single LPAR 203 (e.g., the 1G LPAR) from which the electronic check images may be retrieved for generating the electronic cash letter. The DASD 202 can be transmitted from the local LPARs 203 to the 1G LPAR 203 through a "transmission cloud" 207 via a Network Data Mover (NDM). In step 240, the file containing the electronic check images may be uploaded to a database at the central site (e.g., 1G LPAR 203). In step 250, the system 200 may execute one or more "cash letter jobs" 204 wherein, the system 200 retrieves individual sets of the electronic check images from the database 202 at the 1G LPAR 203 and incorporates the electronic check images into an electronic cash letter 209. It is noted that in the conventional system 200, sixteen cash letter jobs are shown, however, there could be more or less as desired.

As described above and, also, as can be seen in FIGS. 2A and 2B, the conventional system requires the electronic check images to be copied from the database 201 to DASD 202 at that local LPAR 203, then transmitted to a central site (i.e., the 1G LPAR) and then loaded into a database 202 at the central site before the electronic check images can be made available for incorporating into an electronic cash letter. Hence, the above described conventional process is inefficient with regard to: the use of storage space (e.g., DASD), the use of computer resources, and the overall time required to perform the process. First, in the above described conventional system and method, DASD must be allocated at each of the local LPARs 203 and also at the 1G LPAR. This is an inefficient and unnecessary use of DASD. Second, a considerable amount of CPU execution time is consumed at the local LPARs 203 in retrieving the electronic check images from databases 202 and transmitting them to the central site (e.g., 1G LPAR). Additionally, once the electronic check images have been transmitted to the 1G LPAR, even more CPU execution time and resources are required in order to upload the electronic check images to the database 202 at the central site (e.g., 1G LPAR). Third, the above recited steps of: copying electronic check images to a DASD 202 at that local LPAR 203; transmitting them to a central site (e.g., the 1G LPAR); uploading them to a database 201 at the central site, for example, all contribute to the overall time it takes to generate the electronic cash letter. It would be beneficial to have a system which reduces the consumption of DASD, reduces the consumption of computer resources and decreases the overall time required to generate electronic cash letters.

This disclosure describes an inventive system and method for generating electronic cash letters that overcome the drawbacks of the above described conventional system 200. For example, according to aspects of this disclosure, the system and method for generating electronic cash letters include retrieving electronic check images directly from the databases at the local LPARs and incorporating the electronic check images directly from the cash letter job streams. In other words, according to aspects of this disclosure, the inventive system and method eliminate steps of the conventional system 200 described above including the steps of copying electronic check images to DASD at that local LPARs; transmitting the file of the electronic check images to a central site from which the electronic check images can be retrieved for generating the electronic cash letters; and uploading the file containing the electronic check images to a database at the central site. Therefore, the system and method according to aspects of this disclosure reduce, or truncate, altogether the consumption of DASD and also decrease the use of CPU resources compared with the conventional system 200 (e.g., the only CPU resources expended the inventive system and method are during retrieving electronic check images directly from the local databases). Further, the elimination of such steps allows a bank to generate the electronic cash letters more quickly. For example, because the electronic check images are retrieved directly from the databases at the local LPARs, the electronic check images are "immediately" available for cash-lettering once they are loaded into the databases at each of the local LPARs.

Further, by truncating the use of DASD to transmit check images from the local database to the central site we eliminate the consumption of CPU resources by eliminating the need to copy, transmit, upload and store the electronic check images from multiple databases residing on multiple LPARS. In effect, we have more time to generate electronic cash letters rather than waiting for check images to be loaded to a central site database.

Further, the inventive system and method retrieve images within the cash letter job stream much more quickly than the conventional system. This is due in part to the inventive system and method's distributed concurrent retrieval of electronic check images from all of the databases as opposed to retrieving the electronic check images from a pre-loaded database at the central site. In other words, in the conventional system all the cash letter jobs are retrieving check images from the same database placing undue burden on database in servicing all the I/O requests. As will be described in detail below, the inventive system and method may spread the retrieval load across all the databases and, further, may granulate the concurrent retrieval of electronic check images by running multiple concurrent subtasks per database. Therefore, image retrieval rates from 1000-2500 images per second in each cash letter job may be achieved which improves the overall runtime of each cash letter job.

Figure 3:
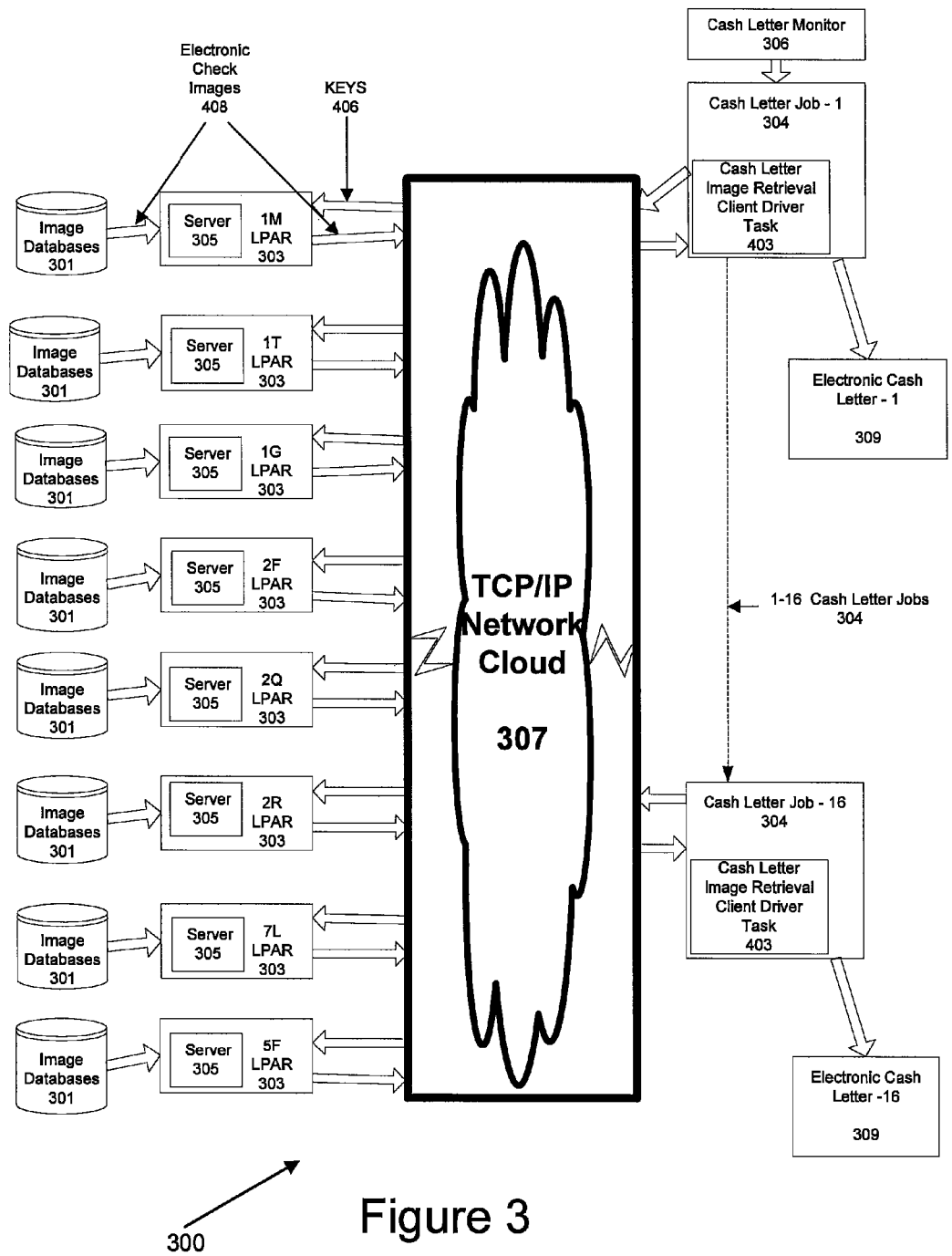
FIG. 3 illustrates a diagram which demonstrates an illustrative system for generating electronic cash letters according to one or more aspects of this disclosure.

FIG. 3 illustrates a diagram which demonstrates an illustrative system and method for generating electronic cash letters according to one or more aspects of this disclosure. As seen in FIG. 3, the illustrative system 300 for generating electronic cash letters according to one or more aspects of this disclosure includes a computer system that comprises at least some of the above described general framework. For example, the illustrative system 300 for generating electronic cash letters according to one or more aspects of this disclosure includes the databases 301 and the eight LPARs 303. Further, as seen in FIG. 3, according to aspects of this disclosure, the inventive system for generating electronic cash letters 300 also includes one or more servers 305 (e.g., a Distributed Image Retrieval System (DIRS) Server) that are operatively connected to the eight LPARs 303 of the system 300 and a cash letter monitor 306 which executes cash letter jobs 304. Further, the inventive system 300 allows the cash letter jobs 304 to communicate with the server 305 on any of the eight LPARs 303 via Transmission Control Protocol (TCP) (commonly referred to as TCP/IP) as represented in FIG. 3 by the TCP/IP Network Cloud 307. Further, according to aspects of this disclosure specifically which employ DIRS on one or more LPARs 303, it is noted that while DIRS is configurable to retrieve electronic check images from any LPAR 303 within the system 300 and return the electronic check images to a client component (e.g., a cash letter job 304) running on any LPAR 303, DIRS may also be configured to perform other functions as well.

As will be described in detail below, the servers 305 allow the cash letter jobs 304 to retrieve electronic check images 408 directly from the databases 301 at the LPARs 303 and incorporate the electronic check images 408 directly into the cash letter streams. Therefore, the inventive system 300 reduces or eliminates altogether the consumption of DASD; reduces computer resources as compared with the conventional system 200; and, also, generates electronic cash letters much more quickly than the conventional system 200.

According to aspects of this disclosure, the new sets of electronic check images 408 (see e.g., FIG. 4) are uploaded into the databases 301 at the LPARs 305 throughout the system 300. Periodically (e.g., every 30 minutes), the cash letter monitor 306 may execute one or more cash letter jobs 304. In the embodiment shown in FIG. 3, the system 300 performs sixteen cash letter jobs every period (however, in other embodiments, the system 300 may perform more or less cash letter jobs 304 as desired). In general terms, the cash letter jobs 304 of the inventive system and method are used to retrieve particular sets of electronic check images 408 directly from the databases 301 at the LPARs 303 and incorporate the sets of electronic check images 408 into the cash letter job streams that are used to generate the electronic cash letters 309. Cash letter jobs 304 will be described in more detail below and with regard to FIG. 4.

Figure 4:
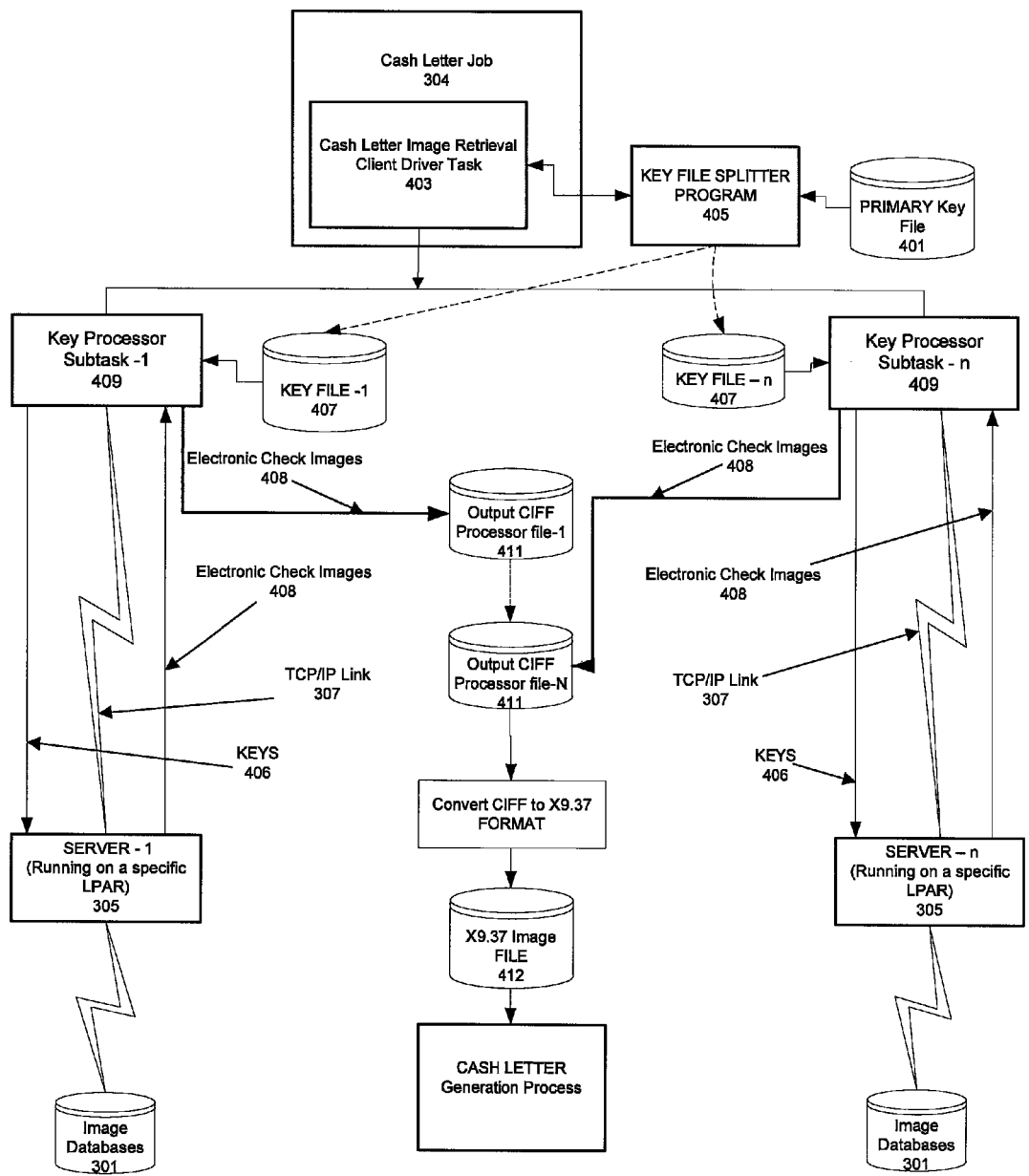
FIG. 4 illustrates a diagram which demonstrates particular aspects of the illustrative system and method for generating electronic cash letters that relate to a cash letter job and its components.

FIG. 4 illustrates a diagram which demonstrates particular aspects of the illustrative system and method for generating electronic cash letters that relate to a cash letter job 304 and its components. According to aspects of this disclosure, each cash letter job 304 is assigned a unique file 401 of check image keys 406 (i.e., a primary "key file") in order to retrieve the electronic check images from one or more of the databases 301 located on any of the eight LPARs 303. A check image key (i.e., a "key") 406 is an identifier for a particular electronic check image 408. For example, a key 406 may be an alphanumeric sequence which functions as a specific, individual ID code for a specific electronic check image 408. A key 406 may be 20 bytes or characters (e.g., numbers). The characters may relate to the check's sorter number, sequence number, date, and the like. For example, according to one embodiment of this disclosure, the format of the key may be "YYYYMMDDSSRRnnnnnn", wherein YYYYYMDD is the date the check was captured, SS is the physical sorter capture device that was used to capture the electronic check image 408, RR is a two digit region number that further identifies where the sorter capture device resides, and nnnnnn is a six digit unique sequence number that is assigned to the check at the capture time. Therefore, the combination of the SS+RR fields may uniquely identify the LPAR 303 and database 301 where the particular electronic check image 408 is stored. Hence, it is understood that such a key 406 may be used to retrieve images from a database 301. In fact, each electronic check image 408 may have such key 406 which the system 300 uses in order to retrieve the electronic check image 408.

Each primary input key file 401 may contain thousands of keys 406 (e.g., 10,000 to 300,000 or more). Each cash letter job 304 then sorts its primary key file 401 (e.g., by SS+RR) and splits out multiple subsets, (i.e., individual key files 407) wherein each individual key file 407 contains keys 406 directed to a specific database 301.

According aspects of this disclosure, and as seen in FIGS. 3 and 4, each cash letter job 304 may include a Cash Letter Image Retrieval Client Driver Task 403. The Cash Letter Image Retrieval Client Driver Task 403 is a client program that is capable of running on any LPAR 303 and is specifically designed to communicate with servers 305 (e.g., DIRS servers) on any LPARs 303 in order to retrieve electronic check images from a database 301 operatively connected to those LPARs 303. The Cash Letter Image Retrieval Client Driver Task 403 reads the primary input key file 401 assigned to the cash letter job 304. The Cash Letter Image Retrieval Client Driver Task 403 may invoke a key file splitter program 405 that sorts the keys 406 of the primary input key file 401 into separate, individual key files 407 that correspond to electronic check images 408 from one particular database 301 on a specific LPAR 303. For example, if the primary key file 401 had 10,000 keys, the splitter program 405 of the Cash Letter Image Retrieval Client Driver Task 403 may sort the keys into 23 individual key files 407 corresponding to the 23 different databases 301 on the system 300 (e.g., 2000 from one database on 1M LPAR, 1000 from a second database on 1M LPAR, 1000 from one database on 1T LPAR, and the like). According to some aspects of this disclosure, the key file splitter program 405 may create more individual key files 407 than the number of databases 301 in the system 300 in order to increase the efficiency of the electronic check images retrieval process. The key file splitter program 405 will be described in more detail later in the disclosure.

As shown in FIG. 4, once the primary input key file 401 is sorted into individual key files 407 by the splitter program 405, the Cash Letter Image Retrieval Client Driver Task 403 then attaches a key processor subtask 409 to each individual key file 407, wherein the key processor subtask 409 is responsible for making the connection to a particular server 305 and to the particular database 301 to which the keys 406 in the attached individual key file 407 correspond. For example, if the key file splitter program 405 created 23 individual key files, then Cash Letter Image Retrieval Client Driver Task 403 would attach 23 key processor subtasks 409 that each communicate via TCP/IP protocol with the server 305 on the specific LPAR 303 at which the particular database 301 is located. The key processor subtasks 409 may run asynchronously, concurrently and independently of each other. By running the key processor subtasks 409 concurrently, the inventive system 300 allows the key processor subtasks 409 to retrieve their own subset of electronic check images 408 at the same time. Therefore, the system 300 effectively achieves overlapped concurrent electronic check image retrieval which bounds the total elapsed time for all the requested electronic check images 408 to the longest running connected key processor subtask 409. Therefore, the system 300 achieves greater overall retrieval rates.

It is noted that, for the sake of clarity, the individual key files 407 and the key processor subtasks 409 attached to the individual key files 407 are represented in FIG. 4 as Individual Key File-1 through Individual Key File-n and Key Processor Subtask-1 through Key Processor Subtask-n. Therefore, it is understood that any number of individual key files 407 and attached key processor subtasks 409 could be variable as desired.

As shown in FIG. 4, each key processor subtask 409 makes a connection with one of the servers 305 (as will be described in further detail below) and identifies a software application 505 (e.g., a software application for retrieving electronic images) (as will be described below) that the key processor subtask 409 wants to run on the server 305. Once the connection is made, the key processor subtask 409 then passes the entire set of keys 406 of the individual key file 407 to the server 305 via TCP/IP protocol. The server 305 loads the requested software application 505 (as will be described in further detail below) and passes the software application 505 the entire set of keys 406 of the individual key file 407. The software application 505 connects to the specific database 301 corresponding to the keys 406 of the particular individual key file 407 via cross memory interface and retrieves the respective electronic check images 408 from the database 301 and transmits the electronic check images 408 back to the key processor subtask 409 via TCP/IP protocol.

The key processor subtask 409 in the meantime waits to receive all the requested electronic check images 408. As the electronic check images 408 are received, the key processor subtask 409 writes the electronic check images 408 to the a dedicated image file 411 (e.g., an output CIFF processor file). Once all the electronic check images 408 are received for a key processor subtask 409, the key processor subtask 409 writes out transmission statistics to a log file, closes its dedicated image file 411, closes the TCP/IP connection on the server side, causing the client side connection to close off and terminate processing, and returns to the Cash Letter Image Retrieval Client Driver Task 403. This process continues until all the key processor subtasks 409 (i.e., the 1-n key processor subtasks 409) running under Cash Letter Image Retrieval Client Driver Task 403 retrieve all their assigned electronic check images 408 from the respective databases 301 and close off the connections.

When all the key processor subtasks 409 of the cash letter job 304 are complete, the Cash Letter Image Retrieval Client Driver Task 403 ends out and the cash letter job 304 obtains all the dedicated image files 411 from Cash Letter Image Retrieval Client Driver Task 403 and then all the retrieved electronic check images 408 are converted to a particular format (e.g., the electronic check images 408 maybe be converted to x9.37 format) and put in an image file 412. The system 300 then uses the electronic check images 408 in the image file 412 to create the electronic cash letters 309 and transmit the electronic cash letters 309 to correspondent banks.

Figure 5:
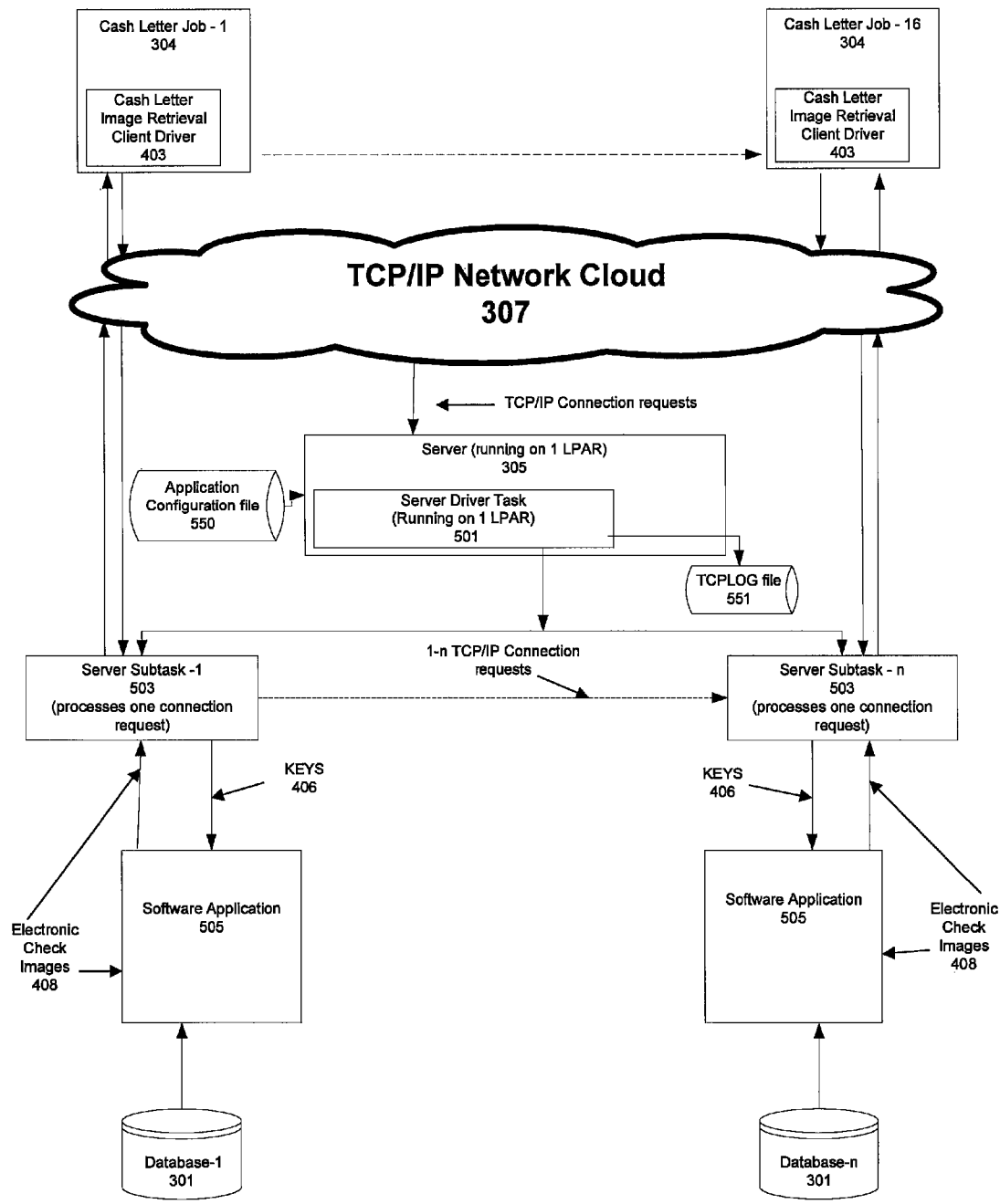
FIG. 5 illustrates a diagram which demonstrates particular aspects of the illustrative system and method for generating electronic cash letters that relate to the server and its components.

FIG. 5 illustrates a diagram which demonstrates particular aspects of the illustrative system and method for generating electronic cash letters that relate to the servers 305 and their components.

Each of the servers 305 of the system 300 comprises a number of software components that work together to retrieve electronic check images 408 and return them back to the Cash Letter Image Retrieval Client Driver Task 403 running in the cash letter jobs 304. The server's components include: a Server Driver Task 501, one or more server subtasks 503 and a software application 505 (e.g., a software application for retrieving electronic check images). The Server Driver Task 501 is responsible for "listening" for client connection requests (e.g., cash letter jobs 304) and allocating those requests to one or more server subtask programs 503 which handle the data transmission with the client (e.g., cash letter jobs 304). The one or more server subtasks 503 run under Server Driver Task 501 which handles the TCP transmission of data between the server 305 and the requesting client (e.g., cash letter job 304). One or more of the server subtasks 503 may be run asynchronously under the Server Driver Task 501. The software application 505 can be any software application that can be run on the server 305. For example, the software application 505 may be a software application for retrieving electronic check images 408. However, other software applications 505 for other purposes may be employed as well. The above software components of the server 305 and their interaction for retrieving requested electronic check images 408 according to one aspect of the disclosure will be described below.

Initially, it is noted that as seen in FIG. 5, a server 305 may communicate with an Application Configuration file 550 and TCPLOG file 551. The Application Configuration File 550 may store a plurality of software applications 505 that can be run under the server 305. As noted above, while one software application 505 may be designed for retrieving electronic check images, other software application 505 may be run under the server 305 that perform wholly different disparate functions than retrieving electronic check images. For example, remote clients other than the Cash Letter Jobs 304 may request other services by specifying what particular software application 505 to run under the server 305. Therefore, it is noted that the server 305 (e.g., a DIRS server) is not limited to only retrieving electronic check images. However, for the below described embodiment for retrieving electronic check images, it will be understood that the software application 505 is a software application for running electronic check images.

The Server Driver Task 501 may run on all LPARS 303 of the system 300. The Server Driver Task 501 configures a TCP/IP listening SOCKET (in TCP/IP network protocol, a SOCKET is a software entity used to track data transmission between endpoints for one connection request) to intercept connection requests from the key processor subtasks 409 of the Cash Letter Image Retrieval Client Driver Task 403 and pass those connection requests to one of the available server subtasks 503. Specifically, the Server Driver Task 501 is idle until a SOCKET connection request comes in via TCP/IP protocol from a key processor subtask 409 of the Cash Letter Image Retrieval Client Driver Task 403. The Server Driver Task 501 then accepts the SOCKET connection request and scans the server subtask control blocks for an available (idle state) server subtask 503. If all its server subtasks 503 are busy processing other connections, the Server Driver Task 501 will attach another server subtask 503. When an available server subtask 503 is found, the Server Driver Task 501 posts the available server subtask 503 with the new SOCKET connection. In response to a post by Server Driver Task 501, the selected server subtask 503 issues a "takesocket" request which effectively transfers over control of the SOCKET channel to server subtask 503.

The server subtask 503 communicates with the key processor subtasks 409 of the Cash Letter Image Retrieval Client Driver Task 403 to ascertain what software application 505 for retrieving electronic check images 408 that the key processor subtask 409 wants to run. Specifically, the server subtask 503 issues a read request to get a key processor subtask 409 "handshake" buffer. Once the "handshake" buffer is received, the server subtask 503 checks for a password and for a software application package 505 for electronic check image retrieval that the key processor subtask 409 wants to run. Assuming the password is correct and the requested software application 505 is present in an application table, the server subtask 503 will load the software application 505 and transfer control to software application 505. It is noted that, for the sake of clarity, the server subtasks 503, are represented in FIG. 5 as server subtasks 1-*n*. Therefore, it is understood that any number of server subtasks 503 could be variable as desired.

As described above, the software application 505 is a module that is called and loaded by server subtask 503. According to aspects of this disclosure, the software application 505 may be a software application for electronic check image retrieval. In other words, the software application will function to retrieve electronic check images 408 from the databases 301. For example, according to some aspects of this disclosure, the software application 505 may be a program that runs under the server subtask 503 and retrieves electronic check images 408 from a database 301 as instructed by a connected client application running on a remote computer. In this example, the remote client is the Cash Letter Image Retrieval Client Driver Subtask 403.

According to some aspects of the disclosure, in order to make a connection to the databases 301, retrieve sets of electronic check images 408 and return them to the key processor subtasks 409 of the Cash Letter Image Retrieval Client Driver Task 403, the software application 505 for electronic check image retrieval may communicate with additional software to enable access to the databases 301. For example, such additional software to which the software application for electronic check image retrieval 505 communicates are commercially available. These interfaces allow external software applications to communicate to a specific database 301 and instruct it to store or retrieve check images. Prior to retrieving electronic check images 408, the software application for electronic check image retrieval 505 requests the key processor subtask 409 send to the software application 505, the set of keys 406 of the individual key file 407. Specifically, the software application 505 communicates with the server subtask 503 and requests server subtask 503 read the set of keys 406 from the key processor subtask 409.

Once the software application 505 receives the set of keys 406, the software application 505 can pass data back and forth and use the TCP/IP SEND/RECEIVE services of server subtask 503 to communicate with the key processor subtasks 409 of the Cash Letter Image Retrieval Client Driver Task 403. After receiving the set of keys 406 from the key processor subtasks 409, the software application 505 communicates with the databases 301 to begin retrieving blocks of electronic check images 408 and returning them back to the key processor subtasks 409 of the Cash Letter Image Retrieval Client Driver Task 403. Specifically, as mentioned above, the software application 505 may interface with additional software applications to connect to the database 301 and retrieve the requested electronic check images 408 and return them to the key processor subtask 409. This is achieved by making a series of block check image requests and returning from each block, each electronic check image 408 back to the key processor subtask 409. The data transmission back to the key processor subtask 409 is achieved by requesting a TCP/IP SEND request to the key processor subtask 409 subtask running under the Server Driver Task 503. Once all the electronic check images 408 are returned to the key processor subtask 409, the SOCKET connection is closed, the software application 505 deleted, and the Server Driver Task 501 returns to an idle state waiting for another connection request.

Particular aspects of the illustrative system and method for generating electronic cash letters that relate to the splitter program/module 405 will be described in detail below. As mentioned above, the Cash Letter Image Retrieval Client Driver Task 403 invokes to a splitter program 405 which performs a series of operations to split the primary input key file 401 into individual key files 407 where each individual key file 407 is effectively one connection to one particular database 301 on a specific LPAR 303. The Cash Letter Image Retrieval Client Driver Task 403 then attaches a key processor subtask 409 to each individual key file 407, wherein each of the key processor subtasks 409 run concurrently and independently of each other and each make separate connections to the servers 305 and databases 301. As described above, in this way, the system 300 is able to achieve performance and runtime gains.

However, according to some aspects of the system 300 the splitter program 405 can split the keys 406 even further and achieve even greater retrieval rates. Specifically, each database 300 can accommodate multiple key processor subtask connections. Therefore, the splitter program 405 may create multiple individual key files 407 for one particular database 301, instead of a single individual key file 407. Hence, the Cash Letter Image Retrieval Client Driver Task 403 will then attach a key processor subtask 409 to each of the multiple individual key files 407 for that database 301 and, therefore, multiple connections to that database 301 are made by the multiple key processor subtasks 409 and the retrieval rate of the electronic check images 408 from that database 301 is increased. For example, according to some aspects of the disclosure the retrieval rates can be in the range of 1000-2500 images per second.

Specifically, the splitter program 405 will determine if the set of keys 406 for a particular database 301 is so great (i.e., if the volume of electronic check images 408 to come from that particular database is so great) that that it will take an inefficient amount of time to retrieve all the electronic check images 408 in the set. If so, the splitter program 405 will create multiple individual key files 407 for that particular database 301 instead of a single individual key file 407. For example, if the splitter program 405 identifies 6000 keys from a database on the 1M LPAR, it may split the 6000 keys into five individual key files 407 of 1200 keys 408 each. Each individual key file 407 is attached to one key processor subtask 409. This way instead of having one key processor subtask 409 pulling all electronic check images 408 from the one database on the 1M LPAR, the system 300 has five key processor subtasks 409 running concurrently and, therefore, achieving noticeable runtime gains. While the above example, splits the keys 406 into five individual key files 407, more or less key files 407 could be used as desired. For example, 10, 15 or 20 individual key files could be used. It is noted, however, that too many connections to the database 301 may overwhelm the database 301 and, therefore, the splitter program 405 may be adjusted to provide an appropriate amount of individual key files for the amount of keys 406 related to a particular database 301 that will increase the retrieval rate without overwhelming the database 301 (and, thereby, actually decreasing the overall time to retrieve the electronic check images 408).

The splitter program (or module) 405 performs a series of operations to split the keys 408 into individual key files 407. Specifically, the splitter program 405 uses at least three configuration parameters in determining how to sort the keys into individual key files 407. Three of the configuration parameters are: MAX TASKS, DATABASE SPLIT THRESHOLD CNT, MAX SUBTASKS PER DATABASE ID.

MAX TASKS is a parameter which specifies the maximum number of key processor subtasks 409 that can be generated by the Cash Letter Image Retrieval Client Driver task 403 and, hence, the maximum number of connections to a database 301 that are required to attach to achieve maximum performance. It is noted that the actual number of key processor subtasks 409 created is a function of the splitter program 405 that creates the split-out individual key files 407.

DATABASE SPLIT THRESHOLD CNT is a parameter that specifies the maximum volume of keys for a given database 301 before the splitter program will further subdivide this volume into smaller key subsets (i.e., individual key files 407) using the MAX SUBTASKS PER DATABASE ID parameter described below).

MAX SUBTASKS PER DATABASE ID is a parameter that is used in conjunction with DATABASE SPLIT THRESHOLD CNT parameter to divide the key volume set for a given database 301 into smaller image key subsets (i.e., individual key files 407) to optimize retrieval performance.

Figure 6:
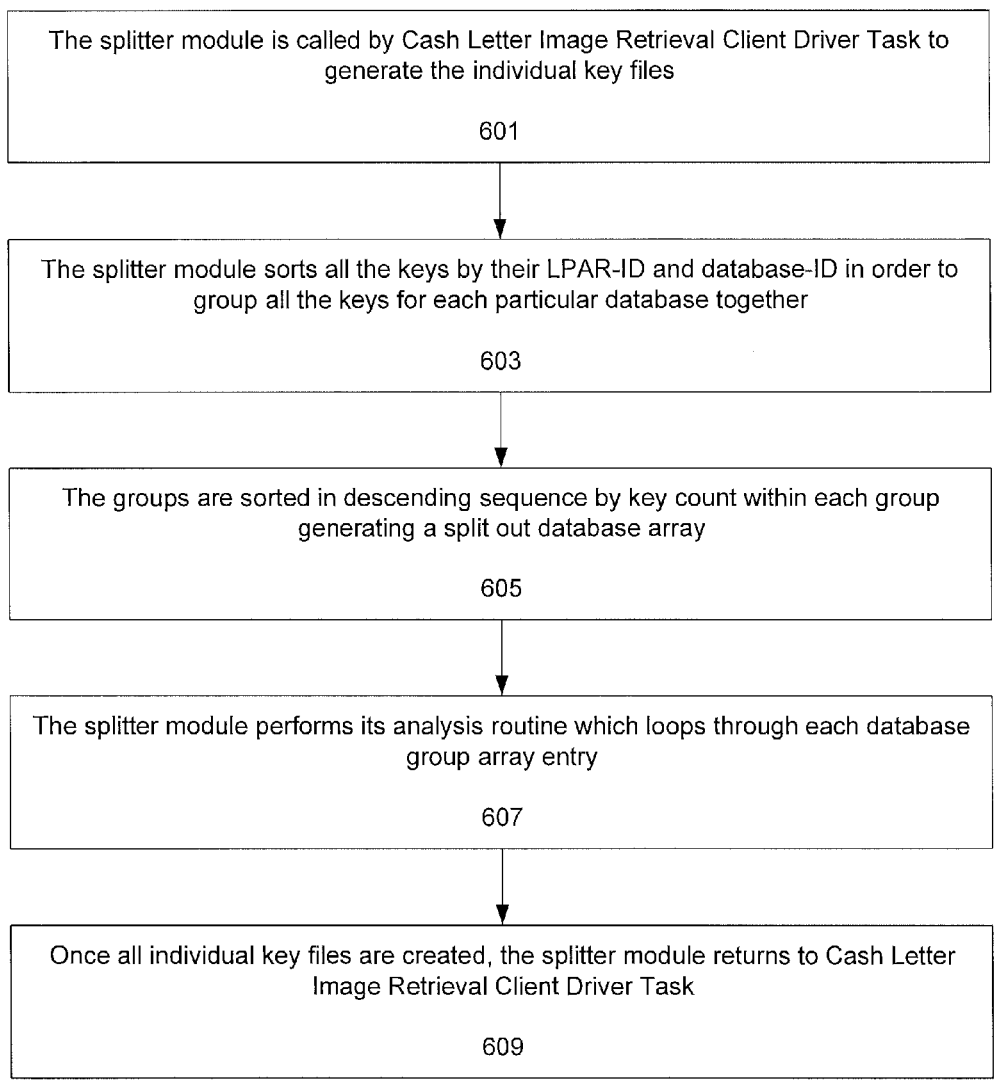
FIG. 6 illustrates a flow chart which demonstrates particular aspects of the illustrative system and method for generating electronic cash letters that relate to a splitter program.

The above parameters of the splitter program 405 and their interaction for splitting up the keys into multiple subsets according to one aspect of the disclosure will be described below and with regard to FIG. 6 which illustrates a flow chart which demonstrates particular aspects of the illustrative system and method for generating electronic cash letters that relate to the splitter program 405.

Initially, the splitter program 405 reads the primary input key file 401 and an EROP.SITE.TABLE file. The site table file may contain an entry for all possible sorter-region combinations (e.g., SS+RR specified in key 406) with the associated LPAR-HOST ID and Database-ID. The site table is loaded into memory by the splitter program 405 and then may tag each key 406 with the associated LPAR-HOST ID and/or Database-ID. The splitter program 405 may then sort the keys 406 by LPAR-HOST ID/Database-ID. It then may use the MAX TASKS, MAX SUBTASKS PER CIMS ID, and CIMS SPLIT THRESHOLD CNT to sort the keys and split out as many individual key files 407 as desired to achieve performance and runtime gains.

For example, as seen in step 601, the splitter module 405 is called by Cash Letter Image Retrieval Client Driver Task 403 to generate the individual key files 407. In step 603, the splitter module 403 may sort all the keys by their LPAR-ID and Database-ID in order to group all the keys 406 for each particular database 301 together. In step 605, these groups may then be sorted in descending sequence by key count within each group and the splitter program 405 may generate a split out database array. This array effectively puts the database group with the largest key count at the top of the array with the lowest key counts following it.

In step 607, the splitter module 403 then performs its analysis routine which loops through each database group array entry and does the following:

If MAX TASKS minus the number of currently generated individual key files is greater than MAX SUBTASKS PER DATABASE ID and the database array entry volume is greater than DATABASE SPLIT THRESHOLD CNT then:
Divide the current database array keys by MAX SUBTASKS PER DATABASE ID to generate MAX SUBTASKS PER DATABASE ID additional individual key files.
ELSE
Write out one individual key file for the entire DATABASE ID array entry.

In step 609, once all individual key files 407 are created, the splitter module 405 returns to Cash Letter Image Retrieval Client Driver Task 403. Depending on the mix of keys 406, there can be anywhere from 1 to MAXTASKS individual key files 407 generated.

Figure 7A:
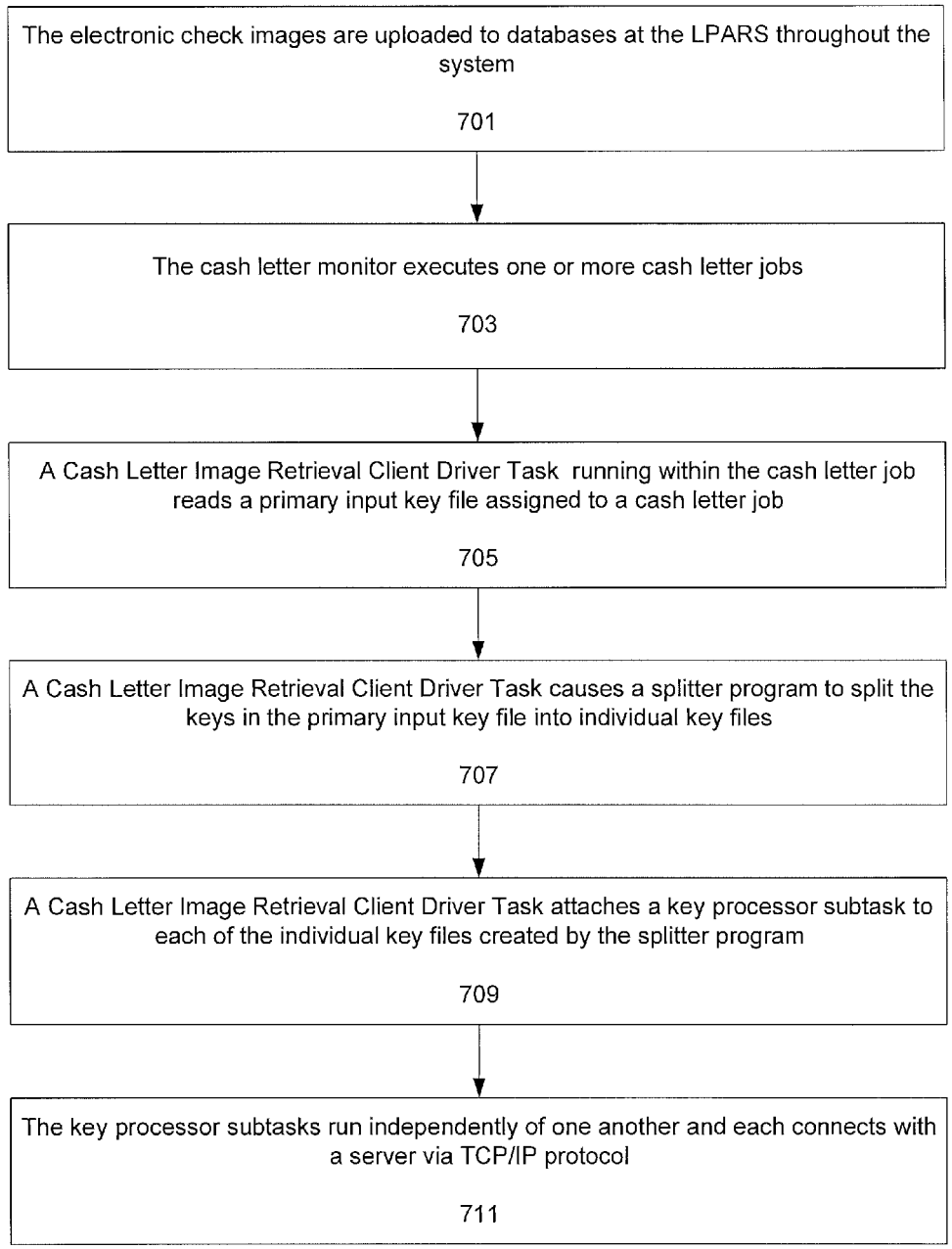
FIGS. 7A-C illustrates a flow chart that describes an illustrative method of generating electronic cash letters according to aspects of this disclosure.
Figure 7B:
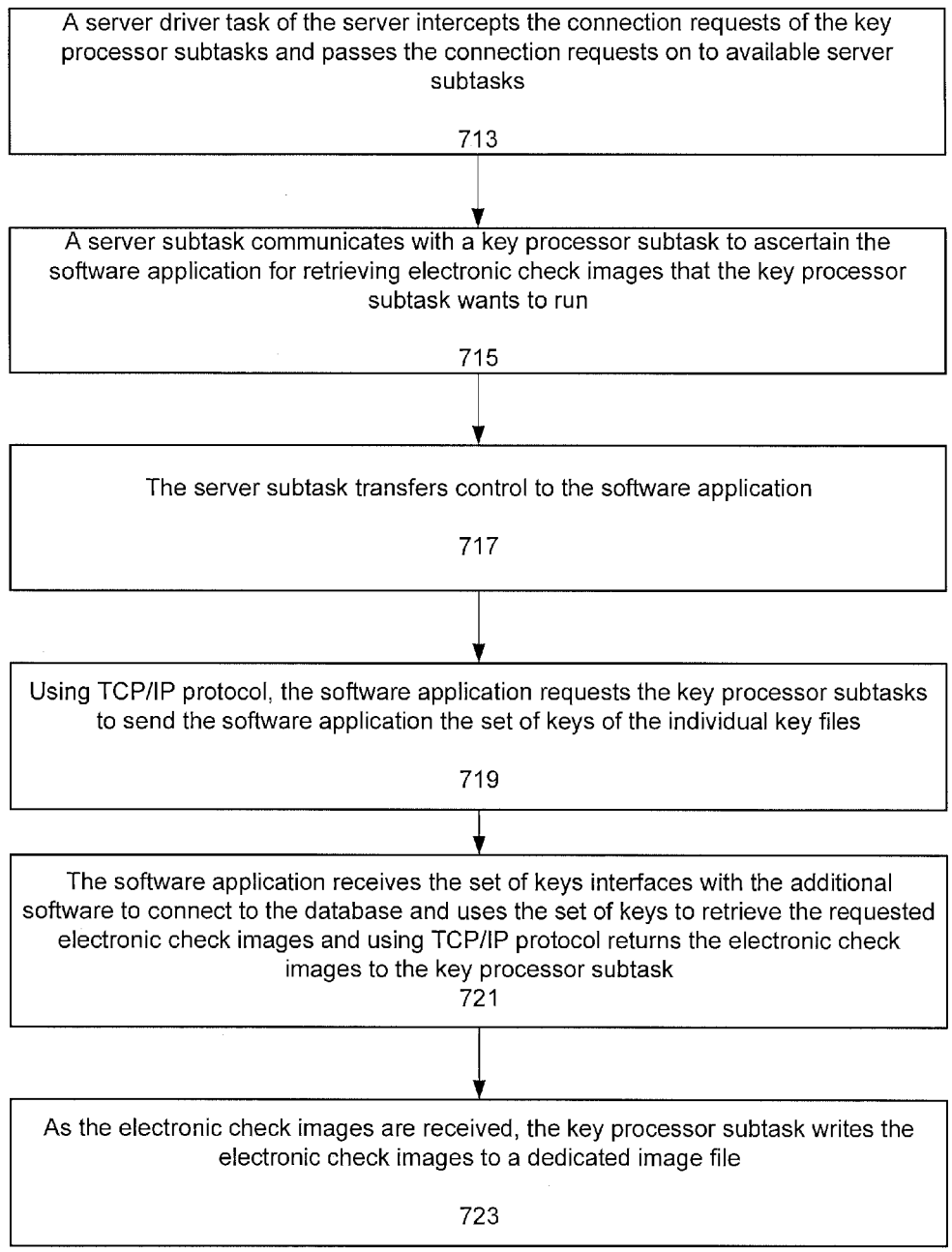
Figure 7C:
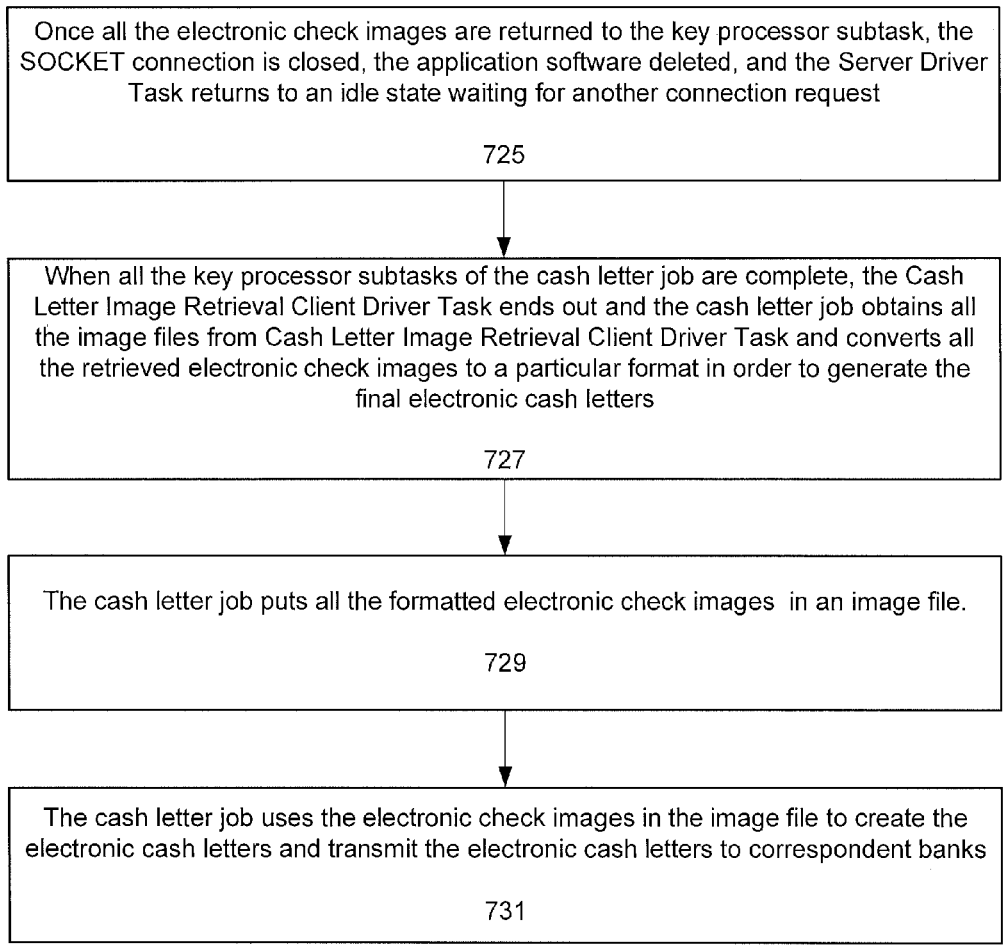

FIGS. 7A-C illustrates a flow chart that describes an illustrative method of generating electronic cash letters according to aspects of this disclosure. In step 701, electronic check images 406 are uploaded to databases 301 at the LPARS 303 throughout the system 300. In step 703, the cash letter monitor 306 executes one or more cash letter jobs 304. In step 705, a Cash Letter Image Retrieval Client Driver Task 403, running within the cash letter job 304, reads a primary input key file 401 assigned to a cash letter job 304. In step 707, a Cash Letter Image Retrieval Client Driver Task 403 causes a splitter program 405 to split the keys 406 in the primary input key file 401 into individual key files 407. In step 709, a Cash Letter Image Retrieval Client Driver Task 403 attaches a key processor subtask 409 to each of the individual key files 407 created by the splitter program 405. In step 711, the key processor subtasks 409 run independently of one another and each connects with a server 305 via TCP/IP protocol. In step 713, a server driver task 501 of the server 305 intercepts the connection requests of the key processor subtasks 409 and passes the connection requests on to available server subtasks 503. In step 715, a server subtask 503 communicates with a key processor subtask 409 to ascertain the software application 505 for retrieving electronic check images 408 that the key processor subtask 409 wants to run. In step 717, the server subtasks 503 transfers control to the software application 505. In step 719, using TCP/IP protocol, the software application 505 requests the key processor subtasks 409 to send the software application 505 the set of keys 406 of the individual key files 407. In step 721, the software application 505 receives the set of keys 406 interfaces with additional software to connect to the database 301 and uses the set of keys 406 to retrieve the requested electronic check images 408 and using TCP/IP protocol returns the electronic check images 408 to the key processor subtask 409. In step 723, as the electronic check images 408 are received, the key processor subtask 409 writes the electronic check images 408 to a dedicated image file 411. In step 725, once all the electronic check images are returned to the key processor subtask 409, the SOCKET connection is closed, the software application 505 deleted, and the Server Driver Task 501 returns to an idle state waiting for another connection request. In step 727, when all the key processor subtasks 409 of the cash letter job 304 are complete, the Cash Letter Image Retrieval Client Driver Task 403 ends out and the cash letter job 304 obtains all the image files 411 from Cash Letter Image Retrieval Client Driver Task 403 and converts all the retrieved electronic check images 408 to a particular format in order to generate the final electronic cash letters 309. In step 729, the cash letter job 304 puts all the formatted electronic check images 408 in an image file 412. In step 731, the cash letter job 304 uses the electronic check images 408 in the image file 412 to create the electronic cash letters 309 and transmit the electronic cash letters 309 to correspondent banks.

In summary, the above described inventive system and method for generating electronic cash letters are advantageous and overcome the drawbacks of the above described conventional system. According to aspects of this disclosure, the inventive system and method for generating electronic cash letters includes retrieving electronic check images directly from the databases at the local LPARs and incorporating the electronic check images directly the cash letter job streams. Thereby, the unnecessary copying of electronic check images to multiple databases and the unnecessary expenditure of DASD and CPU resources are reduced and, further, the electronic cash letters are generated much more quickly. For example, because the electronic check images are retrieved directly from the databases at the local LPARs, the electronic check images are "immediately" available for cash-lettering once they are loaded into the databases at each of the local LPARs. Further, all server connections and image retrievals of the key processor subtasks may be done independently and concurrently and, therefore, the throughput rates of the electronic check image retrieval are increased. Additionally, the system and method include a splitter program which increases the retrieval rate of the electronic check images by sorting the keys and creating as many individual key files as appropriate to achieve performance and runtime gains.

CONCLUSION

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. It will also be appreciated and understood that modifications may be made without departing from the true spirit and scope of the present disclosure. The description is thus to be regarded as illustrative instead of restrictive on the present disclosure.

The invention claimed is:

1. A system for retrieving images comprising:
one or more Logical Partitions (LPARS);
one or more servers operatively connected to the LPARS,
one or more databases operatively connected to one or more of the LPARS;
a processor resident in the one or more servers; and
memory storing computer executable instructions that, when executed by the processor, performs a method for generating one or more electronic cash letters, by:
executing one or more cash letter jobs,
wherein each of the one or more cash letter jobs includes:
reading a primary input key file assigned to the cash letter job, wherein the primary input key file comprises individual key files;
sorting the primary input key file into the individual key files, wherein each of individual key files comprises a group of keys for a particular database of said one or more databases, and wherein each of the keys in the group corresponds to an image stored in the particular database;
sorting the group among a plurality of groups based on a key count determined for each group;
generating a split out database array that places the group with the largest key count at the top of the split out database array;
attaching a key processor subtask of one or more key processor subtasks to each of the individual key files;
running the one or more key processor subtasks concurrently and independently of one another, wherein each of the one or more key processor subtasks connects to one of the one or more servers via TCP/IP protocol and retrieves the images from the particular database that correspond to the keys in each of the individual key files.

2. The system according to claim 1, wherein the servers are configured to intercept connection requests of the one or more key processor subtasks and pass each of the connection requests on to a server subtask,
wherein the server subtask calls a software application for retrieving images, wherein the software application for retrieving images connects to a particular database to which the keys in the individual key file correspond, retrieves the corresponding images and returns the images to the key processor subtask.

3. The system according to claim 2, wherein the software application for retrieving images is configured to request the keys of the individual key file from the key processor subtask and then use the set of keys to retrieve the corresponding images from the database.

4. The system according to claim 3, wherein each of the one or more key processor subtasks is configured to write the returned images to a dedicated image file and when each of the one or more key processor subtasks of the cash letter job are complete, the retrieved images are formatted and incorporated into the electronic cash letter.

5. The system according to claim 1, wherein the images are electronic check images.

6. The system according to claim 1, wherein sorting the primary input key file into individual key files includes creating an individual key file for each of the one or more databases that stores an image that corresponds to at least one key of the primary input key file.

7. The system according to claim 6, wherein sorting the primary input key file into the individual key files includes creating more than one individual key file for the particular database.

8. The system according to claim 1, wherein sorting the primary input key file into individual key files, includes:
performing an analysis routine which loops through each group in the database array and executes the following process:
if a predetermined maximum number of tasks minus the number of currently generated individual key files is greater than a predetermined maximum number of subtasks per database and the database array entry volume is greater than a predetermined database split threshold then divide the current database array keys by the predetermined maximum number of subtasks per database to generate a number of additional individual key files that is equal to the predetermined maximum number of tasks.

9. A computer assisted method for generating an electronic cash letter comprising:
using a computer to electronically retrieve electronic check images from one or more databases that are operatively connected to one or more Logical Partitions (LPARS) that are operatively connected to one or more servers,
wherein electronically retrieving the electronic check images includes using the computer to:
read a primary input key file, wherein the primary input key file comprises individual key files;
sort the primary input key file into the individual key files, wherein each of individual key files comprises a group of keys for a particular database of said one or more databases, and wherein each of the keys in the group corresponds to an image stored in the particular database;
sort the group among a plurality of groups based on a key count determined for each group;
generate a split out database array that places the group with the largest key count at the top of the split out database array;
attach a key processor subtask of one or more key processor subtasks to each of the individual key files; and
run the one or more key processor subtasks concurrently and independently of one another, wherein each of the one or more key processor subtasks connects to one of the one or more servers via TCP/IP protocol and retrieves the electronic check images from the particular database that correspond to the keys in each of the individual key files.

10. The computer assisted method according to claim 9, wherein the servers are configured to intercept connection requests of the one or more key processor subtasks and pass each of the connection requests to a server subtask,
wherein the server subtask calls a software application for retrieving electronic check images, wherein the software application for retrieving electronic check images connects to a particular database to which the keys in the individual key file correspond, retrieves the corresponding electronic check images and returns the electronic check images to the key processor subtask.

11. The computer assisted method according to claim 10, wherein the software application for retrieving electronic check images is configured to request the keys of the individual key file from the key processor subtask and then use the set of keys to retrieve the corresponding electronic check images from the database.

12. The computer assisted method according to claim 11, wherein each of the one or more key processor subtasks is configured to write the returned electronic check images to a dedicated image file and when each of the one or more key processor subtasks of the cash letter job are complete, the retrieved electronic check images are formatted and incorporated into the electronic cash letter.

13. The computer assisted method according to claim 9, wherein sorting the primary input key file into individual key files, includes creating an individual key file for each of the one or more databases that stores an electronic check image that corresponds to at least one key of the primary input key file.

14. The computer assisted method according to claim 13, wherein sorting the keys in the primary input key file into the individual key files includes creating more than one individual key file for the particular database.

15. The computer assisted method according to claim 9, wherein sorting the primary input key file into individual key files, includes:
performing an analysis routine which loops through each database group array entry and executes the following process:
if a predetermined maximum number of tasks minus the number of currently generated individual key files is greater than a predetermined maximum number of subtasks per database and the database array entry volume is greater than a predetermined database split threshold then divide the current database array keys by the predetermined maximum number of subtasks per database to generate a number of additional individual key files that is equal to the predetermined maximum number of tasks.

16. A computer comprising:
a processor; and
memory storing computer executable instructions that, when executed by the processor, configure the computer to perform a method of retrieving electronic check images from one or more databases by:
reading a primary input key file, wherein the primary input key file comprises individual key files;
sorting the primary input key file into the individual key files, wherein each of individual key files comprises a group of keys for a particular database of said one or more databases, and wherein each of the keys in the group corresponds to an image stored in the particular database;

sorting the group among a plurality of groups based on a key count determined for each group; and generating a split out database array that places the group with the largest key count at the top of the split out database array.

17. The computer according to claim 16, wherein sorting the primary input key file into individual key files includes:

determining if a predetermined maximum number of tasks minus the number of currently generated individual key files is greater than a predetermined maximum number of subtasks per database and a database array entry volume is greater than a predetermined database split threshold and, if so, dividing the group of keys by a predetermined maximum number of subtasks per database to generate a number of additional individual key files that is equal to the predetermined maximum number of tasks.

18. The computer according to claim 16, wherein sorting the primary input key file into individual key files includes creating an individual key file for each of the one or more databases that stores an electronic check image that corresponds to at least one key of the primary input key file.

19. The computer according to claim 16, further comprising attaching a key processor subtask of one or more key processor subtasks to each of the individual key files.

20. The computer according to claim 19, further comprising running the one or more key processor subtasks concurrently and independently of each other.

* * * * *